(12) United States Patent
Tamada

(10) Patent No.: US 8,133,571 B2
(45) Date of Patent: Mar. 13, 2012

(54) INTERIOR AUTOMOTIVE TRIM PART AND PROCESS FOR PRODUCING THE SAME

(75) Inventor: Teruo Tamada, Yokohama (JP)

(73) Assignee: Kyoraku Co., Ltd., Tokyo (JP)

( * ) Notice: Subject to any disclaimer, the term of this patent is extended or adjusted under 35 U.S.C. 154(b) by 1073 days.

(21) Appl. No.: 11/910,008

(22) PCT Filed: Mar. 31, 2006

(86) PCT No.: PCT/JP2006/306861
§ 371 (c)(1),
(2), (4) Date: Jan. 17, 2008

(87) PCT Pub. No.: WO2006/106933
PCT Pub. Date: Oct. 12, 2006

(65) Prior Publication Data
US 2008/0254261 A1    Oct. 16, 2008

(30) Foreign Application Priority Data
Mar. 31, 2005 (JP) .................. 2005-101574

(51) Int. Cl.
*B32B 3/00* (2006.01)
*B32B 3/20* (2006.01)
*B32B 1/00* (2006.01)
*B32B 3/12* (2006.01)

(52) U.S. Cl. ........... 428/166; 428/31; 428/178; 428/188

(58) Field of Classification Search .................. 428/166, 428/178, 188, 31, 167; 525/191, 240
See application file for complete search history.

(56) References Cited

U.S. PATENT DOCUMENTS 3,632,674 A * 1/1972 Aishima et al. .................. 525/88
6,060,144 A * 5/2000 Kimura et al. .................. 428/91
(Continued)

FOREIGN PATENT DOCUMENTS
JP    63-092431    4/1988
(Continued)

OTHER PUBLICATIONS

PCT Search Report dated Jun. 27, 2006 of Patent Application No. PCT/JP2006/306861 filed Mar. 31, 2006.

(Continued)

*Primary Examiner* — Catherine A Simone
(74) *Attorney, Agent, or Firm* — Maine Cernota & Rardin

(57) ABSTRACT

An interior article for automobiles is provided having a lightweight and suitable rigidity without lowering moldability even if the amount of use of a thermoplastic resin is decreased. A panel having a hollow double-wall structure and constituting an interior part for automobiles is formed from a mixture of polyolefin resins comprised of a propylene homopolymer having a specific gravity of 0.93 or less (JIS K7112), exhibiting a melt flow rate of 0.3 to 3.0 g/10 minutes (JIS K7210) and exhibiting a bending modulus of 1400 MPa or more (JIS K6758), a crystalline propylene block copolymer having a specific gravity of 0.93 or less (JIS K7112), exhibiting a melt flow rate of 0.3 to 1.5 g/10 minutes (JIS K7210) and exhibiting a bending modulus of 1250 MPa or less (JIS K7171) and a high density polyethylene having a specific gravity of 0.925 to 0.965 (JIS K7112) and exhibiting a melt flow rate of 0.5 g/10 minutes or less (JIS K7210).

6 Claims, 3 Drawing Sheets

U.S. PATENT DOCUMENTS 6,350,828 B1 * 2/2002 Takaoka et al. ............ 526/125.3
6,677,403 B1 * 1/2004 Abe .............................. 525/191

FOREIGN PATENT DOCUMENTS

| | | |
|---|---|---|
| JP | 07-278375 | 10/1995 |
| JP | 07-278449 | 10/1995 |
| JP | 10-235720 | 9/1998 |
| JP | 11-091454 | 4/1999 |
| JP | 11-099559 | 4/1999 |
| WO | 99/07752 A1 | 2/1999 |

OTHER PUBLICATIONS

"Plastics—Determination of Tensile Properties—Part 1: General Principles", Japanese Industrial Standards, 1994.
"Methods for Determining the Density and Specific Gravity of Plastics", Japanese Industrial Standard, 1980.
"Plastics—Determination of Flexural Properties", Japanese Industrial Standard, 1994.
"Testing Method for Melt Flow Rate of Thermoplastics", Japanese Industrial Standard, 1976.

* cited by examiner

INTERIOR AUTOMOTIVE TRIM PART AND PROCESS FOR PRODUCING THE SAME

This application is a national phase application filed under 35 USC §371 of PCT Application No. PCT/JP2006/306861 with an International filing date of Mar. 31, 2006 which claims priority of JP Patent Application 2005-101574 filed Mar. 31, 2005. Each of these applications is herein incorporated by reference in their entirety for all purposes.

TECHNICAL FIELD

The present invention relates to a panel-like interior article for automobiles, in which the interior article has front and back walls produced by blow molding of thermoplastic resin and also in which a rib integrally welded on its inner face of respective hollow part side of the front and back walls is formed at least in between the front and the back walls, and a method of manufacturing the panel-like interior article.

Interior articles for automobiles according to the present invention are used for cargo floor panels (lid panels or luggage boards of automobile load chambers), rear parcel shelves or the like.

BACKGROUND

There are described blow molding articles used as interior material for automobiles or the like, in which a blow molding article with a skin comprised of unwoven fabric is described in Japanese Patent Application Laid-Open (JP-A) No. 63-92431, a hollow double-wall structure panel with a rib used for automobile interiors or the like is described in JP-A-10-235720, and a thermoplastic resin composition having a crystal nucleating agent added therein is described in JP-A-7-278449.
Patent Document 1: JP-A-63-92431
Patent Document 2: JP-A-10-235720
Patent Document 3: JP-A-7-278449

DISCLOSURE OF THE INVENTION

An interior article for automobiles made of thermoplastic resin to be material needs to be selected, from the standpoints of mechanical properties such as rigidity and impact resistance and also moldability and appearance. Although crystalline propylene block copolymers are generally used as thermoplastic resin forming interior articles for automobiles from an impact resistance viewpoint, there are problems in that molten state resin sags (drawdown) down during blow molding and the like. As its measure, different kinds of low melt flow index polyolefin resins are blended.

Additionally, on the other hand, due to the demand for lightening of automobile parts and cost down, the reduction of the amount of use of thermoplastic resin constituting interior articles for automobiles becomes necessary. However, the rigidity of thermoplastic resin is extremely lowered in the case where the amount of use of thermoplastic resin is simply reduced and lightened.

Therefore, an object of an embodiment of the present invention is to provide an interior part for automobiles capable of obtaining interior articles for an automobile having a light weight and exhibiting suitable rigidity without the reduction of moldability, even in the case where the amount of use of thermoplastic resin is reduced to form an interior article for automobiles, and also a method of manufacturing the interior part.

For achievement of the above object, one embodiment of the present invention provides an interior part for automobiles according to claim 1 is characterized by being formed from a thermoplastic resin comprised of a mixture of polyolefin resins comprised of a propylene homopolymer (A) having a specific gravity of 0.93 or less (JIS K7112), exhibiting a melt flow rate of 0.3 to 3.0 g/10 minutes (JIS K7210) and exhibiting a bending modulus of 1400 MPa or more (JIS K7171), a crystalline propylene block copolymer (B) having a specific gravity of 0.93 or less (JIS K7112), exhibiting a melt flow rate of 0.3 to 1.5 g/10 minutes (JIS K7210) and exhibiting a bending modulus of 1250 MPa or less (JIS K7171) and a high density polyethylene (C) having a specific gravity of 0.925 to 0.965 (JIS K7112) and exhibiting a melt flow rate of 0.5 g/10 minutes or less (JIS K7210), and including a hollow double-wall structure comprised of front and back walls opposed at some intervals, a rib integrally welded on its inner face of a hollow part side of the respective front and back walls being formed in between the front and back walls.

The interior part for automobiles according to claim 2 is characterized in that, in an interior part for automobiles of claim 1, the mixture of the polyolefin resins is produced by blending 40 to 80 wt % of the propylene homopolymer (A), 10 to 40 wt % of the crystalline propylene block copolymer (B) and 10 to 40 wt % of the high density polyethylene (C) and that a main component is comprised of the propylene homopolymer (A).

The interior part for automobiles according to claim 3 is characterized in that, in the interior part for automobiles of claim 1 or 2, the thermoplastic resin has a specific gravity of 0.95 or less (JIS K7112) and exhibits a bending modulus of 1550 MPa or more (JIS K7171).

The interior part for automobiles according to claim 4 is characterized in that, in the interior part for automobiles of claim 1, 2 or 3, the crystal nucleating agent is blended in an amount of 0.1 to 15 parts by weight based on 100 parts by weight of the mixture of the polyolefin resins.

The interior part for automobiles according to claim 5 is characterized in that, in the interior part for automobiles of claim 1, the interior part for automobiles is a panel having a hollow double-wall structure and that the average thickness of the front and back walls is 2.0 mm or less.

The interior part for automobiles according to claim 6 is characterized in that, in the interior part for automobiles of claim 1, the above interior part for automobiles is a panel having a hollow double-wall structure and that the average interval of the front and back walls is 25.0 mm or less.

The interior part for automobiles according to one embodiment of the present invention in the interior part for automobiles the ribs formed between the front and back walls are formed in a plurality of numbers and the plurality of ribs each have concave groove-like or plate-like structures arranged at substantially the same interval in the same direction.

A method of manufacturing an interior part for automobiles is a method of manufacturing an interior part for automobiles made of thermoplastic resin, characterized by melting and extruding a single-layer cylindrical parison or a plurality of resin sheets or heating and melting a preliminary molded resin sheet, arranging it in between a separation mold and mold-closing it to form a hollow double-wall structure having a rib integrally welded on its inner face of a hollow part side in between the front and back walls opposed at some interval, the single-layer cylindrical parison or the plurality of resin sheets being made of a mixture of polyolefin resins produced by blending 40 to 80 wt % of a propylene homopolymer (A) having a specific gravity of 0.93 or less (JIS K7112), exhibiting a melt flow rate of 0.3 to 3.0 g/10 minutes (JIS K7210) and exhibiting a bending modulus of 1400 MPa or more (JIS K7171), 10 to 40 wt % of a crystalline propylene block copolymer (B) having a specific gravity of 0.93 or less (JIS K7112), exhibiting a melt flow rate of 0.3 to 1.5 g/10 minutes (JIS K7210) and exhibiting a bending modulus of 1250 MPa or less (JIS K7171) and 10 to 40 wt % of a high density polyethylene (C) having a specific gravity of 0.925 to 0.965 (JIS K7112) and exhibiting a melt flow rate of 0.5 g/10 minutes or less (JIS K7210).

The method of manufacturing an interior part for automobiles according to one embodiment of the present invention is characterized in that, in the method of manufacturing an interior part for automobiles, 0.1 to 15 parts by weight of the crystal nucleating agent is blended based on 100 parts by weight of the mixture of the polyolefin resins to improve crystallinity of the polyolefin resins after molding.

The method of manufacturing an interior part for automobiles according to one embodiment of the present invention is characterized in that, in the method of manufacturing an interior part for automobiles, the ribs formed between the front and back walls are in a plurality of numbers and the plurality of ribs each have concave groove-like or plate-like structures arranged at substantially the same interval in the same direction.

According to one embodiment of the present invention, it is possible to provide a benefit to obtain interior articles for an automobile having a light weight and exhibiting suitable rigidity without the reduction of moldability, even in the case where the amount of use of thermoplastic resin is reduced to form an interior article for automobiles.

DETAILED DESCRIPTION

Figure 1:
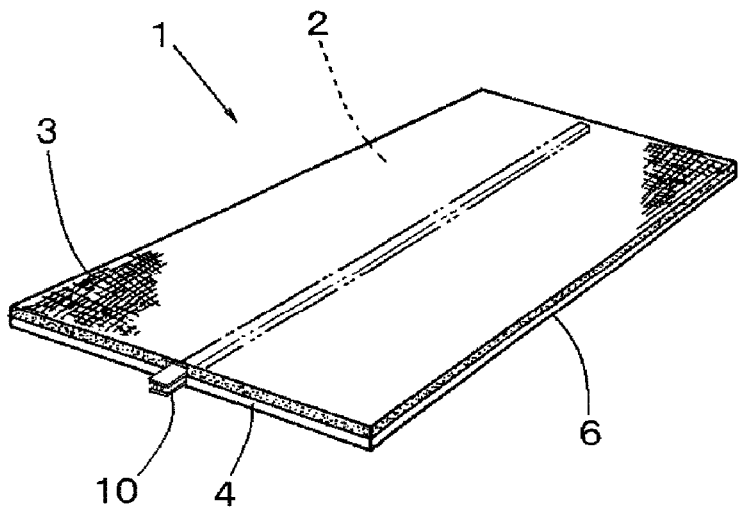
FIG. 1 is a perspective view of a panel having a hollow double-wall structure indicating an example of an interior part for automobiles according to one embodiment of the present invention.
Figure 2:
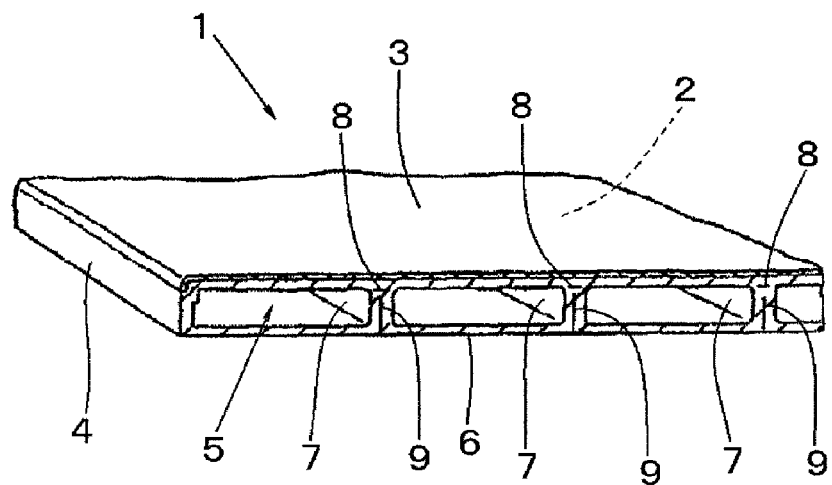
FIG. 2 is a perspective view indicating the interior part, a portion of which is broken, viewed from the surface of the interior part.
Figure 3:
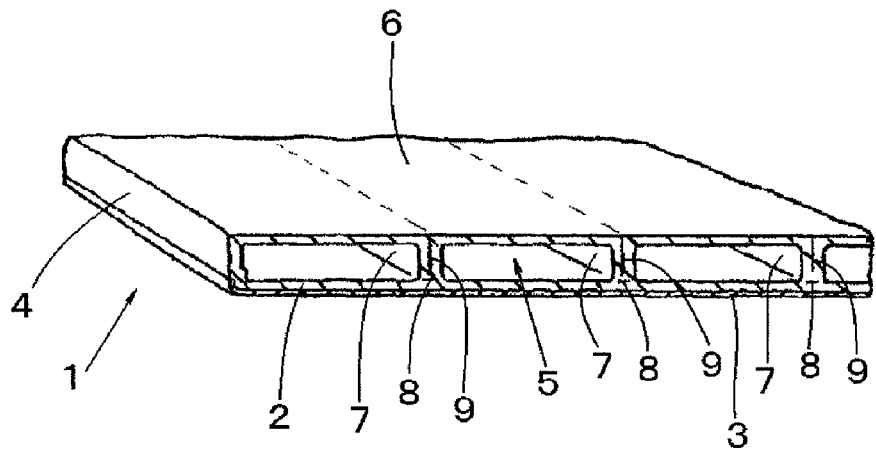
FIG. 3 is a perspective view indicating the interior part, a portion of which is broken, viewed from the back of the interior part.
Figure 4:
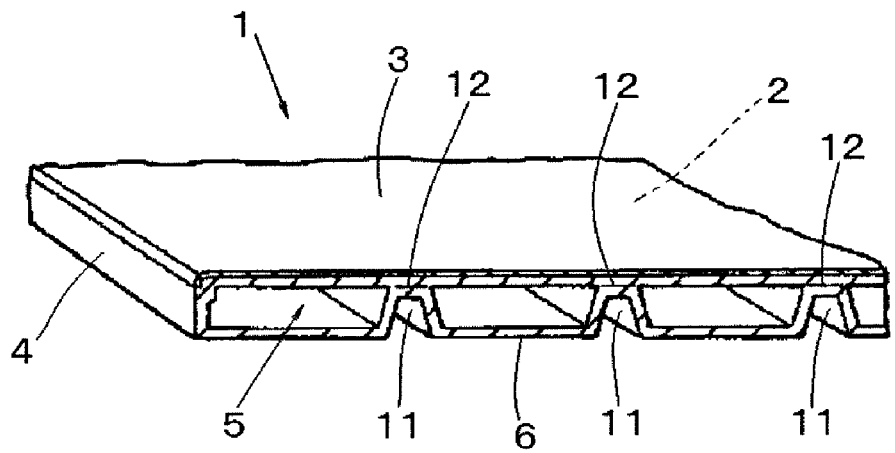
FIG. 4 is a perspective view indicating the interior part, a portion of which is broken, viewed from the surface of another embodiment of the interior part.
Figure 5:
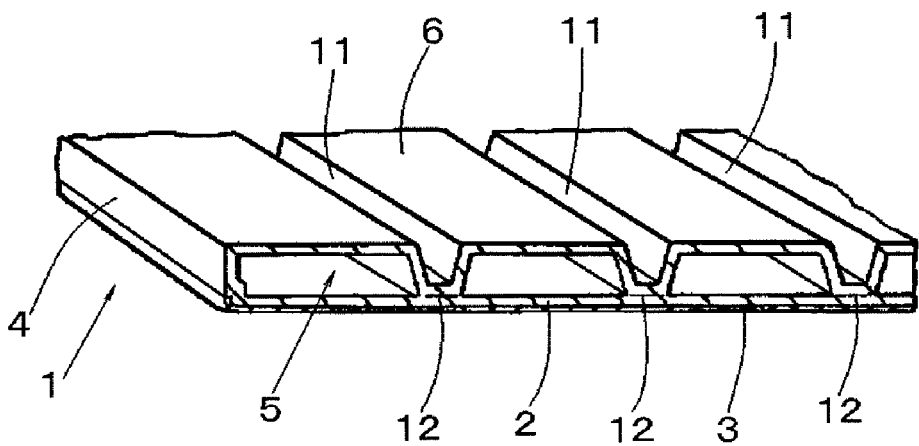
FIG. 5 is a perspective view indicating the interior part, a portion of which is broken, viewed from the back of the above embodiment of the interior part.
Figure 6:
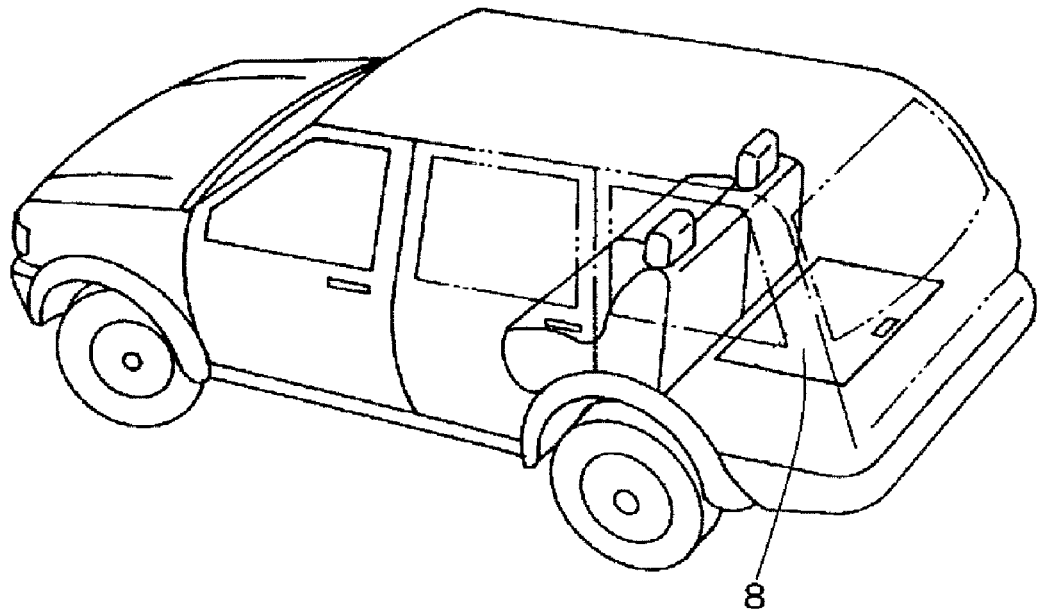
FIG. 6 is a perspective view indicating an example using a panel with a skin of being a blow molded article according to one embodiment of the present invention as a cargo floor panel of automobile.
Figure 7:
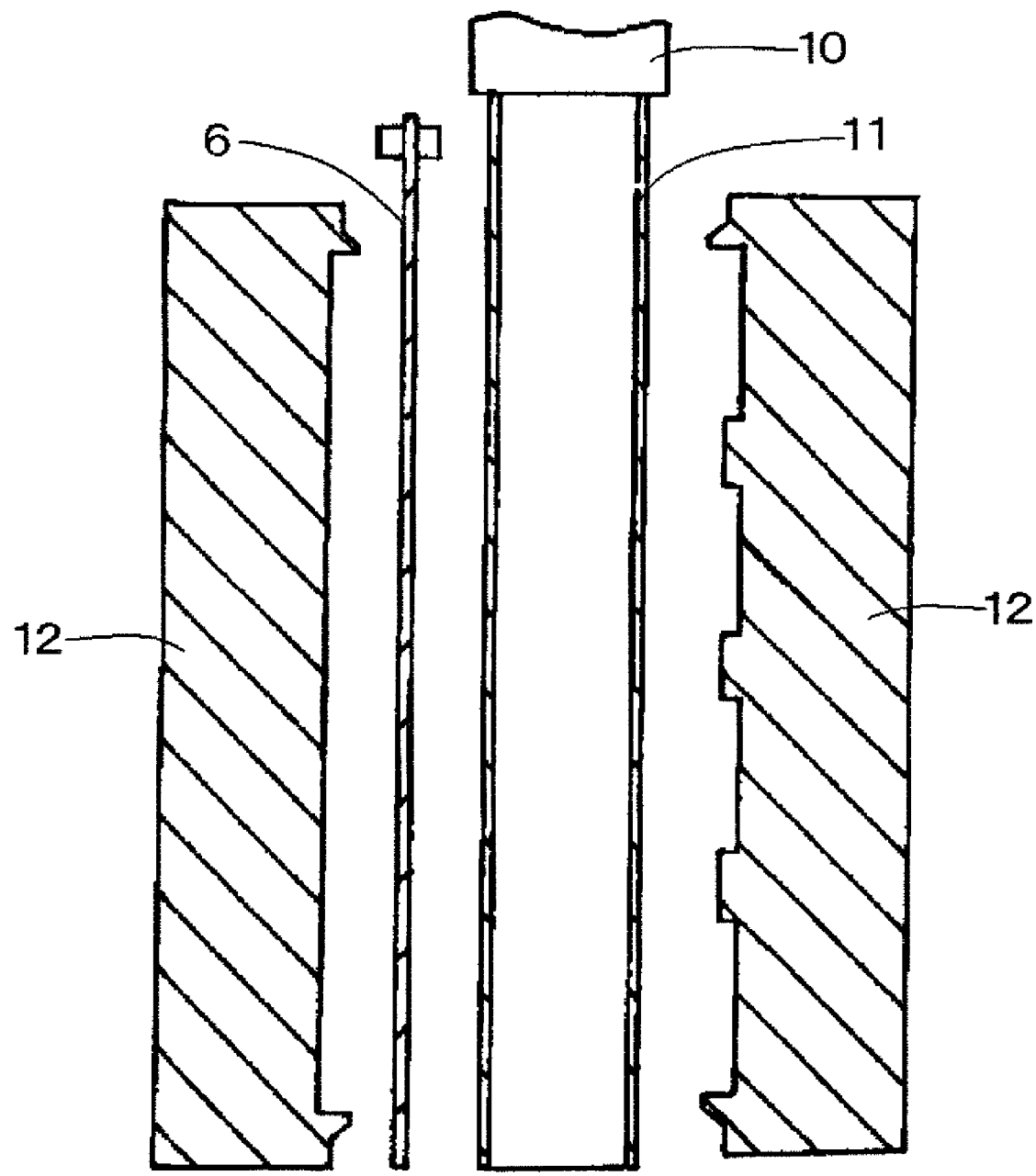
FIG. 7 is a cross-sectional view indicating an embodiment of blow molding of a panel having a hollow double-wall structure indicating an example of an interior part for automobiles according to one embodiment of the present invention.

1: Panel
2: Front wall
3: Skin material
4: Peripheral wall
5: Hollow part
6: Back wall
7: Inner rib
8: Apical face
9: Welded part
10: Reinforcement material
11: Concave rib
12: Apical face One embodiment of the present invention will be set forth in detail with reference to the drawings attached. FIG. 1 is a perspective view of a panel having a hollow double-wall structure indicating an example of an interior part for automobiles according to one embodiment of the present invention; FIG. 2 is a perspective view indicating the interior part, a portion of which is broken, viewed from the surface of the interior part; FIG. 3 is a perspective view indicating the interior part, a portion of which is broken, viewed from the back of the interior part; FIG. 4 is a perspective view indicating the interior part, a portion of which is broken, viewed from the surface of another embodiment of the interior part; FIG. 5 is a perspective view indicating the interior part, a portion of which is broken, viewed from the back of the above embodiment of the interior part. In addition, interior articles for automobiles include cargo floor panels (lid panels or luggage boards of automobile load chambers) and rear parcel shelves.

In FIGS. 1 to 3, reference numeral 1 denotes a panel and this panel 1 is produced by blow molding thermoplastic resin. The panel 1 has a hollow double-wall structure; on the outer surface of a front wall 2 thereof is integrally heat-welded or fixed a skin material 3 by blow pressure during blow molding. The skin material 3 covering the outer surface of the front wall 2 is stuck to, like hanging over, a peripheral wall 4 of the hollow double-wall structure. Reference numeral 5 denotes a hollow part.

On a back wall 6 of the above panel 1 is formed an inner rib 7 made by protruding a part of the inner rib till touching to the front wall 2. The inner rib 7 formed by protruding a portion of the back wall 6 toward the one wall 2 causes its apical face 8 to simply touch the front wall 2 to an extent of substantial no pressing force. However, the apical face 8 of the inner rib 7 is integrally welded to the one wall 2 by the pressing force, so that the panel 1 having the hollow double-wall structure renders the front wall 2 and back wall 6 to be integrated by the inner rib, whereby the panel has large rigidity and strength. The inner rib 7 is present in between the front wall 2 and the back wall 6 and is a planar wall integrally continuously constructed by means of the welded part 9 of the side face by being bridged across the hollow part 5. The inner rib 7 does not have a concave portion like a general rib, so that the back wall 6 has also a planar face. Additionally, a metal reinforced material 10 is inserted and passed through the hollow part 5 of the panel 1.

The panel 1 having a hollow double-wall structure according to one embodiment of the present invention can be, as shown in FIGS. 4 and 5, constructed in such a manner that a concave rib 11 is formed from the back wall 6 to the front wall 2 to integrate the front wall 2 and back wall 6. The apical face 12 of the concave rib 11 is welded on the front wall 2. Additionally, the other constructions are equivalent to those indicated in FIGS. 1 to 3.

The panel 1 having a hollow double-wall structure according to one embodiment of the present invention is formed with a mixture of polyolefin resins comprised of a propylene homopolymer (A), a crystalline propylene block copolymer and a high density polyethylene.

The propylene homopolymer (A) has a specific gravity of 0.93 or less (JIS K7112), exhibits a melt flow rate of from 0.3 to 3.0 g/10 minutes (JIS K7210), exhibits a bending modulus of 1400 MPa or more (JIS K7171) and is blended in the range of from 40 to 80 wt %.

The crystalline propylene block copolymer (B) has a specific gravity of 0.93 or less (JIS K7112), exhibits a melt flow rate of from 0.3 to 1.5 g/10 minutes (JIS K7210), exhibits a bending modulus of 1250 MPa or less (JIS K7171) and is blended in the range of from 10 to 40 wt %.

Furthermore, the high density polyethylene (C) has a specific gravity of 0.925 to 0.965 (JIS K7112), exhibits a melt flow rate of 0.5 g/10 minutes or less (JIS K7210) and is blended in the range of from 10 to 40 wt %.

In a mixture of a polyolefin resin, the propylene homopolymer (A) is the primary component and the mixture is needed such that the amount of blending of the propylene homopolymer (A) is the largest by weight percent concentration.

The above blending causes the thermoplastic resin forming an interior article for automobiles after molding to have a specific gravity of 0.95 or less (JIS K7112) and exhibit a bending modulus of 1550 MPa or more (JIS K7171), thereby being capable of obtaining a light-weight and high-rigidity interior article for automobiles.

In addition, the panel 1 is formed from a thermoplastic resin produced by blending 0.1 to 15 parts by weight of a crystal nucleating agent based on 100 parts by weight of the mixture of the above polyolefin resin. Blending of 0.1 to 15 parts by weight of a crystal nucleating agent suitably increases the crystallinity of the mixture of the polyolefin resin, particularly a crystalline propylene block copolymer by 5% or more, preferably 10% or more.

Furthermore, the above panel 1 has an average thickness of its front wall 2 and back wall 6 of 2.0 mm or less and an average interval of the front wall 2 and back wall 6 of 25.0 mm or less. The inner ribs 7 or concave ribs 11 formed between the front wall 2 and back wall 6 are formed in a plurality of numbers and are each arranged at substantially equal intervals in the same direction. The inner rib 7 or the concave rib 11 improves the rigidity of an inner article for automobiles by means of its shape. Blending of a crystal nucleating agent improves the rigidity of a thermoplastic resin itself forming the rib, and its interaction causes a panel-like interior article for automobiles having a hollow double-wall structure in which a rib, that is integrally welded on its inner face of respective hollow part sides of the front and back walls, is formed to have suitable rigidity to the stress in a deflection direction, thereby not causing distortion. Additionally, the inner rib 7 or concave rib 11 and the reinforced material 10 are arranged substantially in parallel. Contacting the reinforced material with the side face of the rib makes it possible to determine the position of the reinforced material 10. Moreover, from the viewpoints of the circulation of air during blow molding, the strength of the mold and the like, the inner rib 7 or concave rib 11 can be incontinuously formed by disposing intermittence in its portion.

As a crystal nucleating agent used in one embodiment of the present invention, a known crystal nucleating agent used for a resin can be used without limitation and both of inorganic crystal nucleating agents and organic crystal nucleating agents can be used. In other words, the inorganic crystal nucleating agents include talc, clay, zeolite, silica, graphite, carbon black, titanium oxide, aluminum oxide and organic substance modifiers thereof. Suitable examples of the organic crystal nucleating agents include metal benzoate such as sodium benzoate, metal salicylate such as sodium salicylate, metal stearate such as sodium stearate, metal terephthalate such as sodium terephthalate, metal organic carboxylate such as sodium phosphate, other carboxylic amides, ionomers, benzylidene sorbitols, and derivatives thereof.

A skin material can be generally integrally stuck to an interior article for automobiles according to one embodiment of the present invention. The skin materials include natural fibers such as cotton, hemp, wool and silk, regenerated fibers such as viscose rayon and copper ammonia rayon, semi-synthetic fibers such as acetate and rayon, synthetic fibers such as nylon, polyester, acryl, vinylon, polypropylene and polyurethane, and knit, textile and unwoven textile, obtained by processing the blend fibers. The skin material is suitable in design when being raised cloth or sheared cloth having fluff in states raised toward outside, perpendicular to a direction of the spread of the cloth, and may not have fluff. Furthermore, the skin material may also be a resin sheet of thermoplastic resin such as vinyl chloride, polyethylene, polypropylene and polyurethane. When the skin material is a resin sheet, a fiber sheet, an expanded sheet, a known lining material or the like for improvement of cushioning, air staying prevention between the skin material, parison and the like, and sticking strength between the skin material, parison and the like can be laminated. Of these, unwoven cloth having a weight per unit area of 100 g/m$^2$ or more, comprised of polyester, polypropylene or polyamide, is particularly preferable from the viewpoint of moldability.

In addition, although the skin material is primarily stuck to the front wall of the front and back walls constituting the plate-like main body, the sticking of a skin material comprised of unwoven cloth and the like to both of the front and back walls makes it possible to cover with the skin material over the entire face without exposing the plate-like main body. Here, at least one of the skin materials stuck to both of the front and back walls, particularly the skin material stuck to the back wall, can be made to be a reinforced sheet exhibiting bending modulus of 2100 MPa or more and having a thickness of 1.0 mm or less or unwoven cloth exhibiting a broken strength of 90 kg/m$^2$ or more.

The blow molding in one embodiment of the present invention involves melt extruding a tubular parison or a plurality of resin sheets or overheat-melting a resin sheet subjected to preliminary molding and placing the resulting material in between separation molds and performing mold clamping to form a desired shape, i.e., refers to direct blow molding or sheet blow molding, and does not matter whether or not air blowing is involved.

INDUSTRIAL APPLICABILITY

One embodiment of the present invention relates to a panel-like interior article for automobiles, in which the interior part has front and back walls produced by blow molding of thermoplastic resin and also in which a rib integrally welded on its inner face of respective hollow part side of the front and back walls is formed at least in between the front and back walls, and a method of manufacturing the panel-like interior article.

Interior articles for automobiles according to various embodiments of the present invention are used for cargo floor panels (lid panels or luggage boards of automobile load chambers), rear parcel shelves or the like.

The invention claimed is:
1. An interior part for automobiles made of a thermoplastic resin, said interior part comprising:
thermoplastic resin comprised of a mixture of polyolefin resins comprising:

a propylene homopolymer having a specific gravity of not more than 0.93, exhibiting a melt flow rate of 0.3 to 3.0 g/10 minutes
and exhibiting a bending modulus of not less than 1400 MPa;
a crystalline propylene block copolymer having a specific gravity of not more than 0.93, exhibiting a melt flow rate of 0.3 to 1.5 g/10 minutes and exhibiting a bending modulus of not more than 1250 MPa and a high density polyethylene having a specific gravity of 0.925 to 0.965 and exhibiting a melt flow rate of not more than 0.5 g/10 minutes and comprises a hollow double-wall structure including front and back walls opposed at some intervals, a rib integrally welded on its inner face of a hollow part side of said respective front and back walls being formed in between the front and back walls, wherein said mixture of said polyolefin resins is produced by blending 40 to 80 wt % of said propylene homopolymer, 10 to 40 wt % of said crystalline propylene block copolymer and 10 to 40 wt % of said high density polyethylene, and a main component is comprised of said propylene homopolymer.

2. The interior part for automobiles according to claim 1 wherein
the thermoplastic resin has a specific gravity of not more than 0.95 and exhibits a bending modulus of not less than 1550 MPa.

3. The interior part for automobiles according to claim 1, wherein
a crystal nucleating agent is blended in an amount of 0.1 to 15 parts by weight based on 100 parts by weight of the mixture of said polyolefin resins.

4. The interior part for automobiles according to claim 1, wherein
said interior part for automobiles is a panel having a hollow double-wall structure and
an average thickness of the front and back walls is not greater than 2.0 mm.

5. The interior part for automobiles according to claim 1, wherein
said interior part for automobiles is a panel having a hollow double-wall structure and
an average interval of the front and back walls is no greater than 25.0 mm.

6. The interior part for automobiles according to claim 1, wherein
further comprising a plurality of said ribs each have concave groove or plate structures arranged at substantially the same interval in the same direction.

* * * * *